United States Patent [19]
Yamamoto et al.

[11] Patent Number: 6,040,958
[45] Date of Patent: Mar. 21, 2000

[54] MAGNETIC HEAD SLIDER AND MAGNETIC DISK APPARATUS HAVING THE MAGNETIC HEAD SLIDER

[75] Inventors: Takayuki Yamamoto; Yoshiharu Kasamatsu; Takashi Toyoguchi; Toru Yokohata; Ryosuke Koishi, all of Kanagawa, Japan

[73] Assignee: Fujitsu Limited, Kawasaki, Japan

[21] Appl. No.: 08/766,967

[22] Filed: Dec. 16, 1996

[30] Foreign Application Priority Data

Apr. 26, 1996 [JP] Japan .................................. 8-106930

[51] Int. Cl.[7] ...................................................... G11B 5/60
[52] U.S. Cl. .............................................................. 360/103
[58] Field of Search .................................... 360/103–104

[56] References Cited

U.S. PATENT DOCUMENTS 4,757,402  7/1988  Mo ........................................... 360/103
5,841,608  11/1998  Kasamatsu et al. ...................... 360/103

FOREIGN PATENT DOCUMENTS

| 0568252 | 11/1993 | European Pat. Off. ............... 360/103 |
| 19531746 | 3/1996 | Germany . |
| 56-107363 | 8/1981 | Japan ..................................... 360/103 |
| 63-37874 | 2/1988 | Japan . |
| 5-89626 | 4/1993 | Japan ..................................... 360/103 |

*Primary Examiner*—Allen T. Cao
*Attorney, Agent, or Firm*—Greer, Burns & Crain, Ltd.

[57] ABSTRACT

A magnetic head slider has a plurality of rail planes to generate a floating force by using an air flow passing through a region between a group of the rail planes and a magnetic disk rotated at a constant rotating speed, and the slider floats up into the air according to the floating force. Also, the slider has a first pad arranged near an air inflow end of one rail plane and a second pad arranged near an air outflow end of the same or another rail plane, and a height of the first pad and a height of the second pad respectively range from 20 to 50 nm. Therefore, a coefficient of a friction between the pads and the magnetic disk can be reduced, and the wear of the pads can be prevented. Also, the contact of an electromagnetic transducing device attached to the air outflow end of the rail plane with the magnetic disk can be prevented.

11 Claims, 13 Drawing Sheets

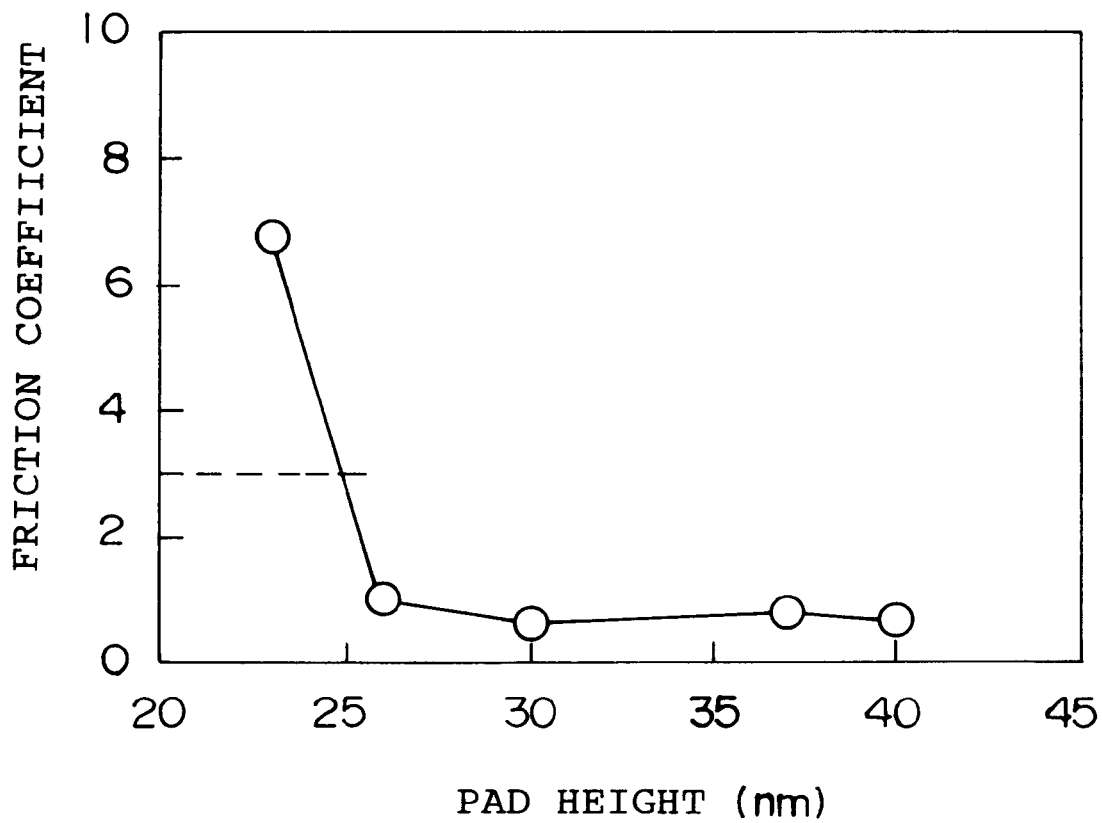

RELATIVE VELOCITY
OF THE SLIDER

MAGNETIC HEAD SLIDER AND MAGNETIC DISK APPARATUS HAVING THE MAGNETIC HEAD SLIDER

BACKGROUND OF THE INVENTION

1. Field of the Invention

The present invention relates generally to a slider having a magnetic head and a magnetic disk apparatus with the slider, and more particularly to a slider floating up over a surface of a magnetic recording medium in an actuating time of a magnetic disk apparatus and a magnetic disk apparatus with the slider.

2. Description of the Prior Art

A magnetic disk operated according to a contact start-stop (CSS) method in which a floating type head is used has been widely adopted. In the CSS method, a slider having a magnetic head is put on a CSS region of a magnetic disk surface in a halt time of the magnetic disk apparatus, and the slider is floated up over a surface of a magnetic disk in an actuating time of the magnetic disk apparatus. In general, a reading and writing magnetic head is attached to the slider, the slider is supported by a suspension, and the slider is moved over the magnetic disk with the movement of the suspension.

The reason that the slider having the magnetic head floats up over the magnetic disk surface in the actuating time is that an air flow occurs on the magnetic disk surface when the magnetic disk is rotated. That is, the magnetic head slider floats up according to a principle of a dynamic air bearing.

In the above magnetic disk apparatus, the apparatus has been gradually downsized, and information can be recorded in the magnetic disk at a high density. Therefore, a flying height of the slider is gradually lowered. However, in cases where a flying height of the slider is lowered, there is a drawback that the slider contacts with asperities of the magnetic disk surface and is damaged. To prevent the drawback, the roughness of the magnetic disk surface is lowered to prevent the contact of the slider with the magnetic disk.

However, because a contact area between the slider and the magnetic disk in the CSS region is enlarged as the surface roughness of the magnetic disk is lowered, the slider easily adheres to the magnetic disk. In this case, there is another drawback that a motor torque required to rotate the magnetic disk is increased and the suspension supporting the magnetic head is easily damaged when the rotation of the magnetic disk is started.

To reduce the adhesion of the slider to the magnetic disk, a plurality of pads (hereinafter, also called projecting portions) are provided on an air bearing plane (hereinafter, also called a floating plane or a rail plane) of the slider facing the magnetic disk, so that the contacting area between the slider and the magnetic disk is reduced. This technique is, for example, disclosed in a Published Unexamined Japanese Patent Application No. S63-37874 (1988).

However, in cases where the pads are provided on the rail plane, the load of HGA (head-gimbal assembly) is put on the pads, so that there is another drawback that the pads are easily worn out because of the friction between the pads and the magnetic disk. Also, there is another drawback that the pads prevent the magnetic head be set to be close to the magnetic disk surface.

SUMMARY OF THE INVENTION

An object of the present invention is to provide, with due consideration to the drawbacks of such a conventional a magnetic head slider with pads and a conventional magnetic disk apparatus with the magnetic head slider, a slider having a magnetic head in which the adhesion to a magnetic disk is suppressed, the wear of the pads in a CSS (contact start stop) is suppressed and the contact with a magnetic disk in an actuating time is reliably prevented. Also, the object is to provide a magnetic disk apparatus with the slider.

In the present invention, a height of pads which are provided on a rail plane of a slider having a magnetic head is set in a range from 20 to 50 nm. In cases where the pad height is set to the range, a coefficient of the friction between the slider and the magnetic disk can be reduced to a desired value while considering a thickness of lubricant coated on the magnetic disk surface (or a magnetic recording medium surface) and a roughness of the magnetic disk surface.

Also, in cases where a pad is provided on a first rail plane placed at one side portion of the slider and another pad is provided on a second rail plane placed at another side portion of the slider, a distance from the pad provided on the first rail plane to a back end (or an air outflow end) of the first rail plane is set to differ from the distance from the pad provided on the second rail plane to an air outflow end of the second rail plane. Therefore, in cases where the slider is floated up over the magnetic disk while inclining the slider in a lateral direction perpendicular to a rotating direction of the magnetic disk, the pad of the first (or second) rail plane of which a flying height from the magnetic disk is lower than that of the second (or first) rail plane is placed on condition that the distance from the pad of the first (or second) rail plane to the air outflow end of the first (or second) rail plane is shorter than that from the pad of the second (or first) rail plane to the air outflow end of the second (or first) rail plane, so that the contact of the pad of the first (or second) rail plane with the magnetic disk surface can be prevented. In this case, to stably put the slider on the magnetic disk, it is preferred that the pad of the second (or first) rail plane of which a flying height from the magnetic disk is higher than that of the first (or second) rail plane be closer to the air outflow end of the second (or first) rail plane.

Also, when the magnetic disk is rotated at a constant speed, because a circumferential speed of the magnetic disk at a particular position becomes high as the particular position is far from a rotational center of the magnetic disk, a speed of an air flow occurring under the slider on the surface of the magnetic disk becomes high as the slider is far from the rotational center of the magnetic disk. Therefore, because a flying height of the slider at its front end (or an air inflow end) is increased as the slider is far from the rotational center of the magnetic disk, a probability that the pad of the second (or first) rail plane placed to be closer to the air outflow end of the second (or first) rail plane contacts with the magnetic disk surface is considerably reduced.

Therefore, in the present invention, the configuration of the slider is determined on condition that a flying height of one rail plane to which any magnetic head (hereinafter, called an electro-magnetic transducer) for a reading or writing operation is not attached is lowered as the slider is far from the rotational center of the magnetic disk. As an example of the configuration of the slider, a rail plane width at a portion of each rail plane near to the electro-magnetic transducer is set to be narrower than that at a portion of each rail plane far from the electro-magnetic transducer.

Also, a width of each of the pads provided on the rail planes depends on a width of each rail plane. Therefore, in cases where each pad is lengthened in the direction of a length of the rail plane to sufficiently enlarge a size of each pad, a contacting area between each pad and the magnetic disk surface is sufficiently enlarged, and the wear of the pads can be prevented.

Also, in the present invention, a value obtained by subtracting a flying height of a projection (or pad) arranged on the slider from a flying height of the electro-magnetic transducer attached to the slider is set to change from a negative value at an outer circumference of the magnetic disk to a positive value at an inner circumference of the magnetic disk. Therefore, the projection of the slider preferentially contacts with the magnetic disk at the inner circumference of the magnetic disk before the electro-magnetic transducer contacts with the magnetic disk, so that the contact of the electro-magnetic transducer with the magnetic disk can be prevented.

BRIEF DESCRIPTION OF THE DRAWINGS

FIG. 1A-2 is an enlarged view of an electro-magnetic transducing device of FIG. 1A-1;

FIG. 2 is a sectional view showing a condition that a plurality of bar bodies respectively shown in FIG. 1B are set in a holder;

FIG. 4B-1 is a sectional view taken along a line IV(B)–IV(B) of FIG. 4A;

FIG. 4B-2 is a close-up view of a floating region of the slider of FIG. 4A;

FIG. 5 shows a relationship between a height of a pad of the slider having the magnetic head according to the first embodiment of the present invention and a coefficient of a friction at a magnetic disk surface;

FIGS. 6A-1, 6A-2 and 6B are sectional views showing another layer structure between the wafer and the slider having the magnetic head according to the first embodiment of the present invention;

DESCRIPTION OF THE PREFERRED EMBODIMENTS

Preferred embodiments of a slider having a magnetic head and a magnetic disk apparatus with the slider according to the present invention are described with reference to drawings.

First Embodiment

A manufacturing process for a slider, to which a magnetic head is attached, according to a first embodiment of the present invention is described.

Figures 1, 1A:
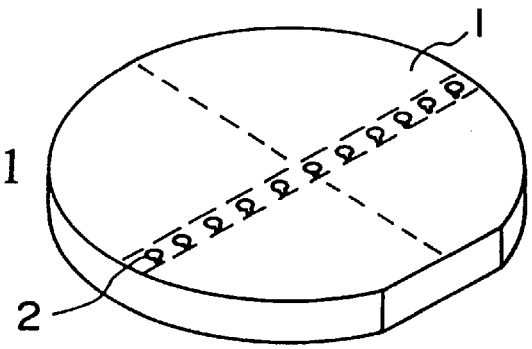
FIG. 1A-1 is a diagonal view of a wafer used to form a slider having a magnetic head according to a first embodiment of the present invention.
Figures 1, 1A, 2:

As shown in FIG. 1A-1, a plurality of electro-magnetic transducing devices 2, as seen in more detail in FIG. 1A-2, are initially formed on a principal plane of a wafer 1 made of an alumina titanium carbide ($Al_2O_3TiC$), ferrite or calcium titanate in longitudinal and lateral directions. Each electro-magnetic transducing device 2 is, for example, a magneto-resistance effect device or an inductance device.

Figure 1B:
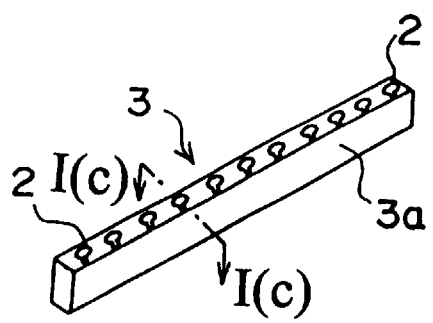
FIG. 1B is a diagonal view of a bar body obtained by dividing the wafer shown in FIG. 1A-1.

Thereafter, the wafer 1 is cut off along a dot-dash line of FIG. 1A-1 by using a dicing saw, and a plurality of bar bodies 3 as seen in more detail in FIG. 1B, respectively having a plurality of electro-magnetic transducing devices 2 arranged in series are obtained. Because each bar body 3 is divided into a plurality of sliders respectively having a magnetic head in a later process, a taper is formed in advance at an air inflow end of each slider. In this case, a floating plane 3a as seen in FIG. 1B, of each slider is placed on a side of each bar body 3 on which a magnetic pole of the electro-magnetic transducing device 2 is exposed.

Figure 1C:
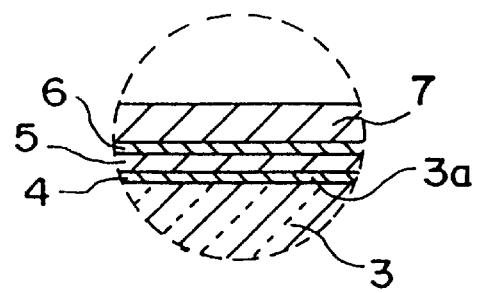
FIG. 1C is a sectional view taken along a line I(c) of FIG. 1B to show a condition that a series of films having a multi-layer structure is formed on a surface of the bar body.
Figure 1D:
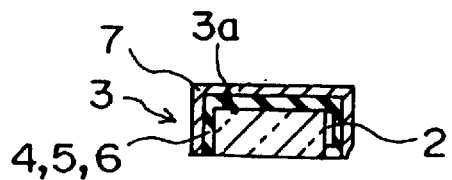
FIG. 1D is an enlarged sectional view showing the film of FIG. 1C formed on a floating plane and the electro-magnetic transducing device.
Figure 2:
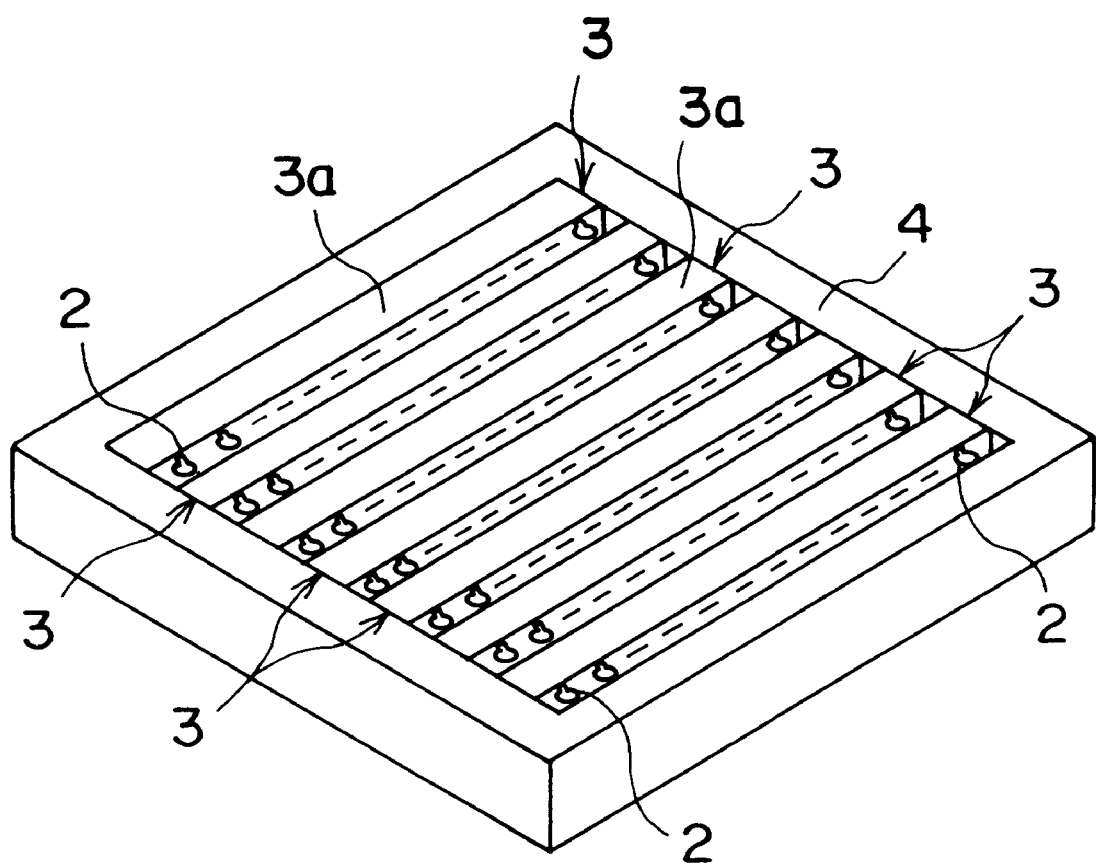

Thereafter, as shown in FIGS. 1C and 1D an intermediate film 4 is formed on the floating plane 3a and the electro-magnetic transducing devices 2 as seen in more detail in FIG. 1D of each bar body 3 at a thickness of 5 nm by using a film forming technique such as a sputtering, a chemical vapor deposition or a vapor deposition. Thereafter, a protective film 5 made of a diamond like carbon (hereinafter, called DLC) is formed on the intermediate film 4 at a thickness of 10 nm by using the film forming technique such as a sputtering, a chemical vapor deposition or a vapor deposition. The protective film 5 is used to protect the floating plane 3a and the electro-magnetic transducing devices 2. Also, the intermediate film 4 is used to improve the adhesion of the bar body 3 to the protective film 5. Therefore, in cases where the adhesion of the bar body 3 to the protective film 5 is superior, the intermediate film 4 is not required.

Thereafter, a silicon film 6 of a thickness ranging from 2 to 5 nm and a DLC film 7 of a thickness ranging from 20 to 50 nm are formed on the protective film 5 in that order. The DLC film 7 is patterned in a later process, and a plurality of pads are formed. Also, the silicon film 6 functions as an etching stopper when the DLC film 7 is patterned.

Thereafter, as shown in FIG. 2, the plurality of bar bodies 3 are put on a holder 8 and are fixed to the holder 8. In this case, a surface of each bar body 3 on which the plurality of electro-magnetic transducing devices 2 are arranged is directed in a side direction, and the floating plane 3a of each slider is directed in an upper direction. An inner structure of the holder 8 prevents the bar bodies 3 freely move. Also, a multi-layer structure from the intermediate film 4 to the DLC film 7 is omitted in FIG. 2 to make clear the arrangement of the bar bodies 3 in the holder 8.

Figure 3A:
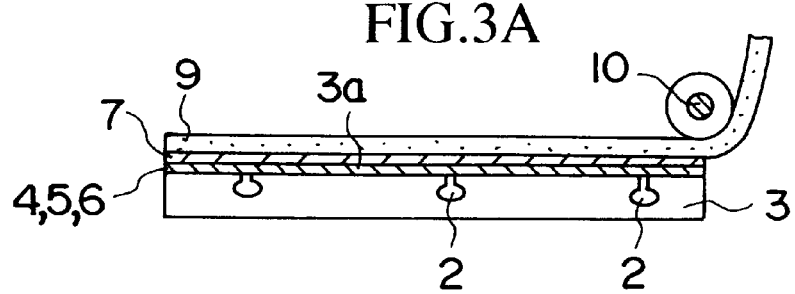
FIGS. 3A to 3H are side views showing a patterning process for the slider having the magnetic head according to the first embodiment of the present invention.
Figure 3B:
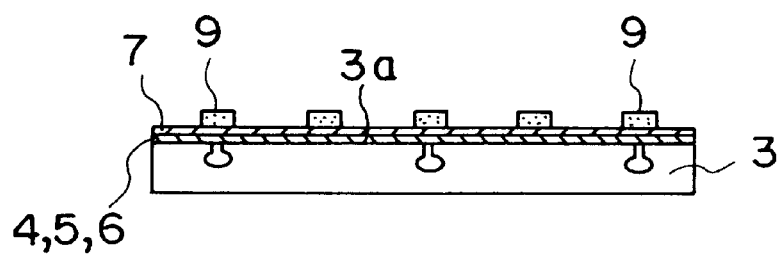

Thereafter, as shown in FIG. 3A, a first film resist 9 is laminated on the DLC film 7 by using a "laminator" (laminating tool). Thereafter, the first film resist 9 is exposed and developed, so that the first film resist 9 is remained on a pad forming region as shown in FIG. 3B. A plane shape of the first film resist 9 patterned is not limited to a circle shape, an elliptical shape or a parabolic shape on condition that an air flow is not disturbed by the patterned first film resist 9 when a slider floats up into the air. The patterned first film resist 9 is used as a first mask. A reference numeral 10 indicates a roller of the laminator.

Figure 3C:
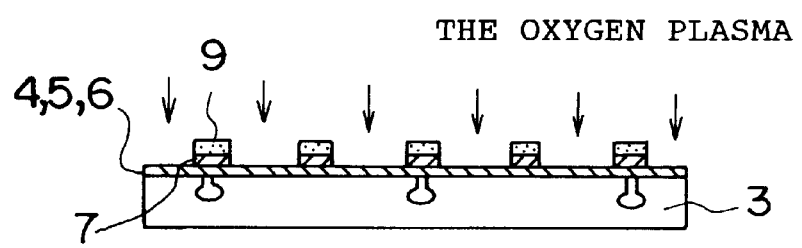

Thereafter, the bar bodies 3 arranged in the holder 8 are put in a reactive ion etching (RIE) apparatus, and portions of the DLC film 7 not covered with the patterned first film resist 9 are etched by oxygen plasma occurring in the RIE apparatus. Therefore, the DLC film 7 is patterned, and a plurality of pads 7a shown in FIG. 3C are formed on the multi-layer 4, 5 and 6. A height of each pad 7a is equal to a film thickness of the DLC film 7.

In this patterning process, because an etching rate of the silicon film 6 etched by the oxygen plasma is very low or zero, the etching of the DLC film 7 can be easily controlled. Also, the protective film 5 placed under the silicon film 6 is not etched, so that the floating plane 3a and the electro-magnetic transducing devices 2 are covered with the protective film 5. In this case, the control of an etching time is preferred. Also, it is preferred that an etching operation finishing time be judged according to a change of a wavelength of plasm light occurring in the etching operation.

Figure 3D:
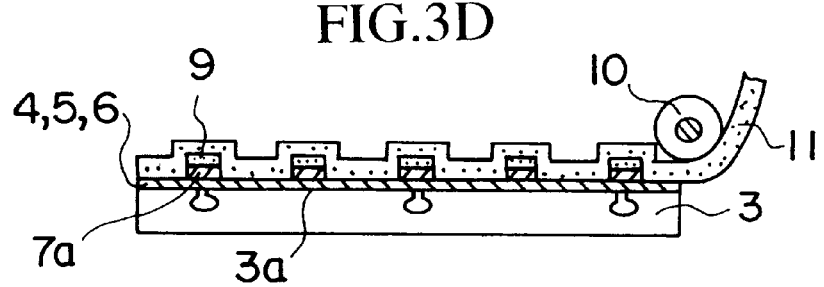

Thereafter, as shown in FIG. 3D, a second film resist 11 is laminated on each bar body 3 by again using the laminator, so that the first film resist 9, the silicon film 6 and the pads 7a are covered with the second film resist 11.

Figure 3E:
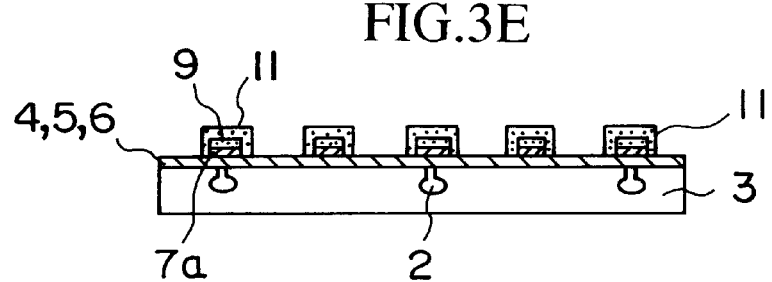

Thereafter, the second film resist 11 is exposed and developed, and, as shown in FIG. 3E, portions of the floating plane 3a are removed on condition that other portions of the floating plane 3a formed in a rail shape are remained. Because each electro-magnetic transducing device 2 exists in the neighborhood of one rail shaped region of the floating plane 3a, the electro-magnetic transducing devices 2 are covered with the second film resist 11.

Therefore, portions of each bar body 3 respectively used as a negative region of one slider and portions of each bar body 3 respectively used as a boundary region between sliders are uncovered with the second film resist 11.

Figure 3F:
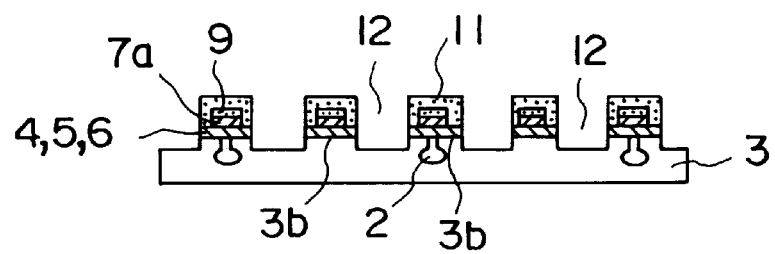

Thereafter, the second film resist 11 formed in a stripe shape is used as a second mask, the silicon film 6, the protective film 5, the intermediate film 4 and the bar body 3 are etched according to an ion milling, so that a plurality of concave portions 12 are formed. Therefore, as shown in FIG. 3F, one concave portion 12 is arranged in one negative region of each slider and each circumferential region between sliders.

Figure 3G:
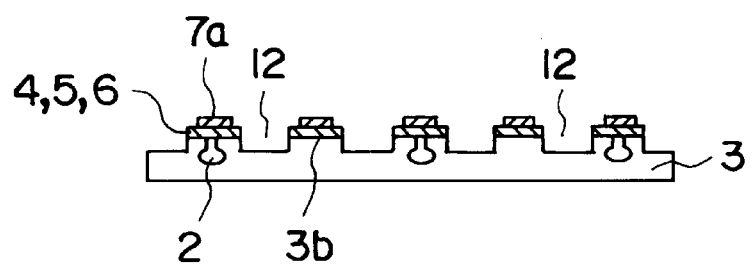

Thereafter, as shown in FIG. 3G, the first and second film resists 9 and 11 are washed and removed by using acetone. In cases where the first film resist 9 is not removed in advance, the wash of the resists can be finished at one time, so that a throughput of the sliders is not reduced.

Figure 3H:
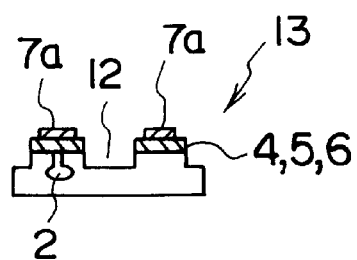

Thereafter, each boundary portion between sliders of each bar body 3 is cut off, and a plurality of sliders 13 are obtained from each bar body 3. One slider 13 is shown in FIG. 3H.

Figure 4A:
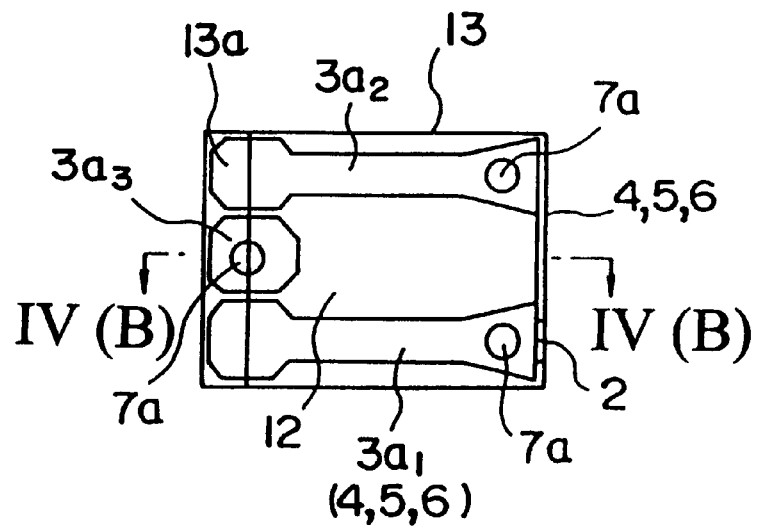
FIG. 4A is an upper view of the slider having the magnetic head according to the first embodiment of the present invention.

As an example, the slider 13 for the magnetic head formed in the above processes has a bottom shape shown in FIG. 4A. Here, a reference numeral 3a in FIG. 4A indicates a taper plane.

Figures 1, 4B:
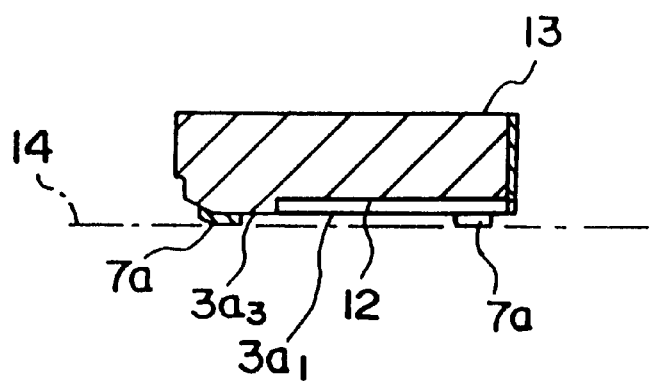

In this slider 13, a first floating region 3a1 as seen in more detail in FIGS. 4A and 4B-1, and a second floating region 3a2, as seen in more detail in FIGS. 4A and 4B-2, respectively formed in a rail shape are separately arranged on both sides of a bottom surface, and each of the floating regions 3a1 and 3a2 is constricted in the middle. Therefore, when a magnetic disk is rotated, a floating force for floating the slider 13 put on the magnetic disk into the air is generated. Also, a third floating region 3a3, as seen in more detail in FIGS. 4A and 4B-2, formed in an island shape is arranged between the floating regions 3a1 and 3a2 near an air inflow end. Each of the floating regions 3a1, 3a2 and 3a3 is called a rail plane 3a.

Also, the concave portion 12 surrounded by the first, second and third floating regions 3a1, 3a2 and 3a3 is the negative region. Because the negative region is set to a negative pressure when the slider 13 floats up, a flying height of the slider 13 at its back end (or an air outflow end) is lower than that at its front end (or an air inflow end) when the slider 13 floats up.

Further, at least one pad 7a, as seen in more detail in FIGS. 4B-1 and 4B-2, is arranged near the back end of each of the first and second rail planes 3a1 and 3a2, and one pad 7a is arranged on the third rail plane 3a3. Each of the pads 7a is formed at a height ranging from 20 to 50 nm, as follows.

In FIG. 5, in cases where the height of the pad 7a is lower than 25 nm, a coefficient of a friction between the pad 7a and a surface of a magnetic disk 14 is increased, so that there is a probability that spindle motor can not rotate. Therefore, the height of the pad 7a lower than 25 nm is not preferred. Also, in cases where the height of the pad 7a arranged near the air outflow end of each of the first and second rail planes 3a1 and 3a2 is higher than 50 nm and the pad 7a is placed close to the electro-magnetic transducing device 2, the flying height of the pad 7a becomes lower than that of the electro-magnetic transducing device 2, the pad 7a can easily come into contact with asperities on the surface of the magnetic disk 14. Therefore, the height of the pad 7a higher than 50 nm is not preferred.

As shown in FIG. 5, the friction coefficient is about 3 and is comparatively low in case of the pad height of 25 nm. A friction coefficient equal to or lower than 1 is desired, it is required to set the pad height to a value equal to or more than 27 nm. However, in cases where a surface roughness of the magnetic disk 14 and a film thickness of lubricant coated on the magnetic disk 14 are set to appropriate values, a lower limit of the pad height determined to set the friction coefficient to a value lower than ??? is 20 nm.

Figures 1, 6A:
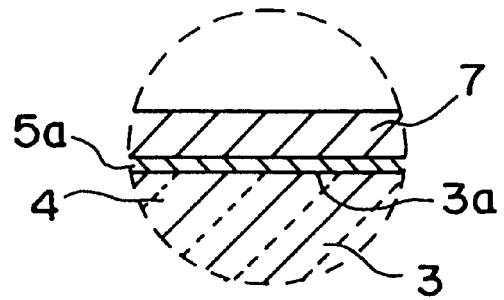
Figures 2, 6A:
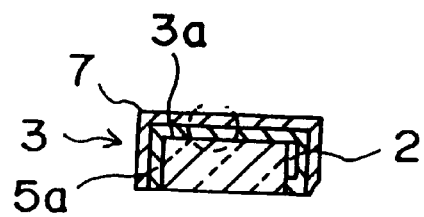

The pad 7a is obtained by patterning the DLC film 7, and the rail plane 3a on which the pad 7a is arranged does not contact with the magnetic disk 14. Therefore, as shown in FIGS. 6A-1 and 6A-2, it is applicable that a single layer of a silicon film, a silicon carbide film or a silicon oxide film be arranged as a protective film 5 covering the rail plane 3a and the electro-magnetic transducing device 2 as more clearly seen in FIG. 6A-2. That is, the silicon film, the silicon carbide film or the silicon oxide film functions to improve the adhesion of the DLC film 7 composing the pad 7a to the wafer 1, the silicon film 6 and the intermediate film 4 can be omitted.

Figure 6B:
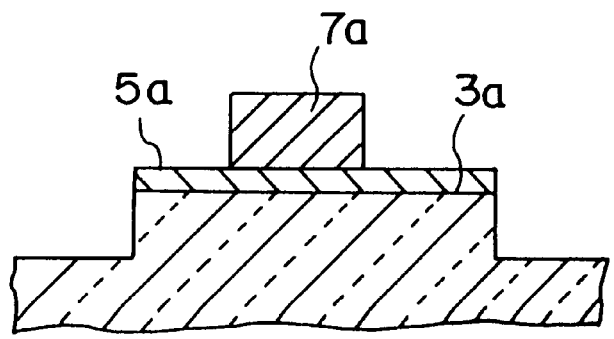

In this film structure, as shown in FIG. 6B, the rail plane 3a is covered with a protective film 5a made of silicon, silicon carbide or silicon oxide, and the pad 7a made from the DLC film 7 is arranged on the protective film 5a. A film thickness of the silicon, the silicon carbide or the silicon oxide is, for example, set to about 5 nm. Therefore, because only one film exists between the pad 7a and the rail plane 3a, a film forming time can be shortened, a throughput of the sliders can be improved.

Figure 7:
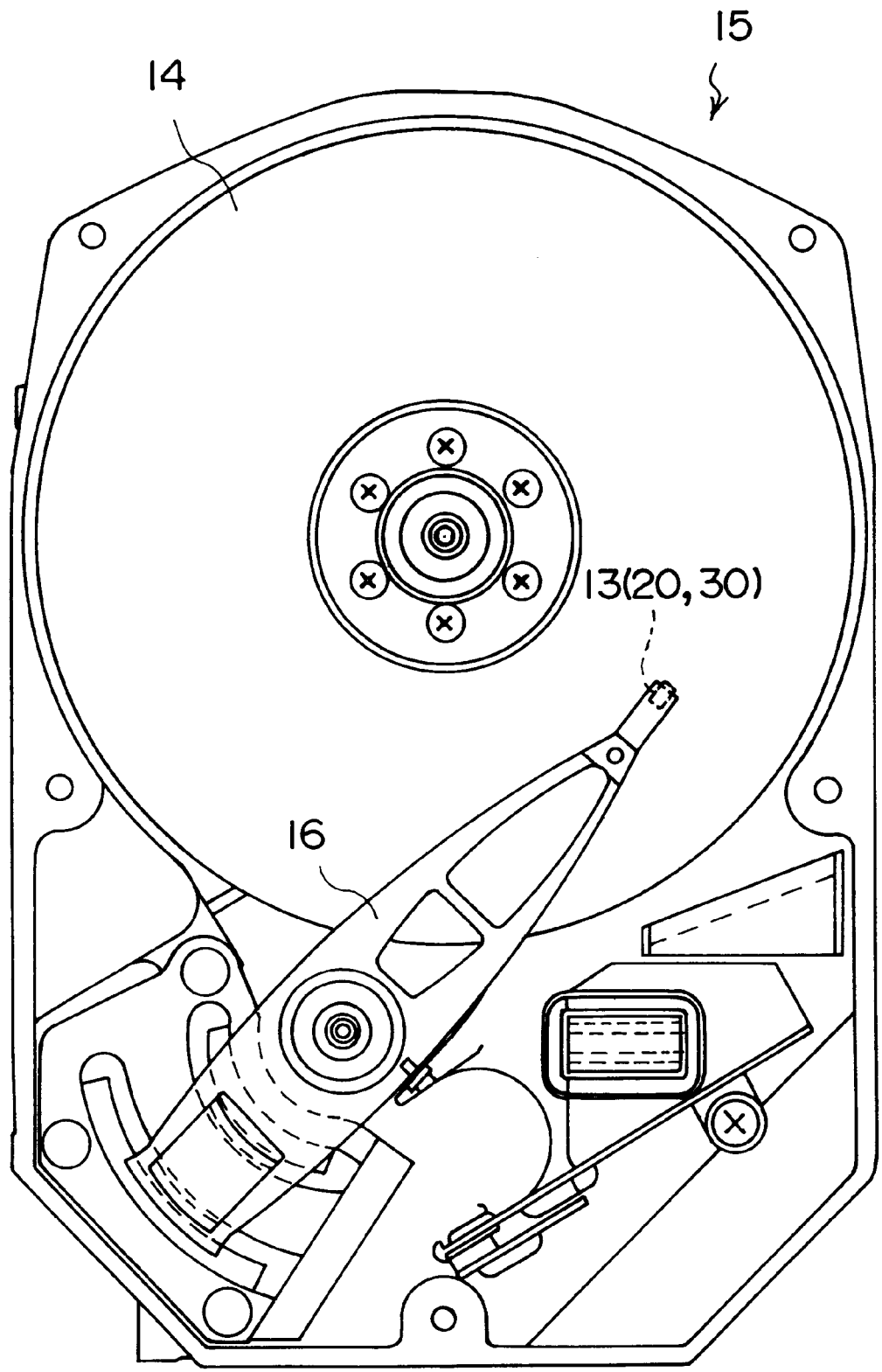
FIG. 7 is an internal plan view of a magnetic disk apparatus with the slider having the magnetic head according to the first embodiment of the present invention.

As shown in FIG. 7, the slider 13 to which the electro-magnetic transducing device 2 is attached is attached to a top end of a suspension (or a spring arm) 16 in a magnetic disk apparatus 15, and the slider 13 moves over the magnetic disk 15 by operating the suspension 16.

Second Embodiment

In a method of the first embodiment in which two film resists are used by using the laminator, an upper value of a diameter of the pad 7a is limited by a width of the rail plane 3a. In cases where an area of the pad 7a is narrowed because the diameter of the pad 7a is shortened, the pad 7a is rapidly worn out because of the friction between the magnetic disk 14 and the pad 7a.

Figure 8A:
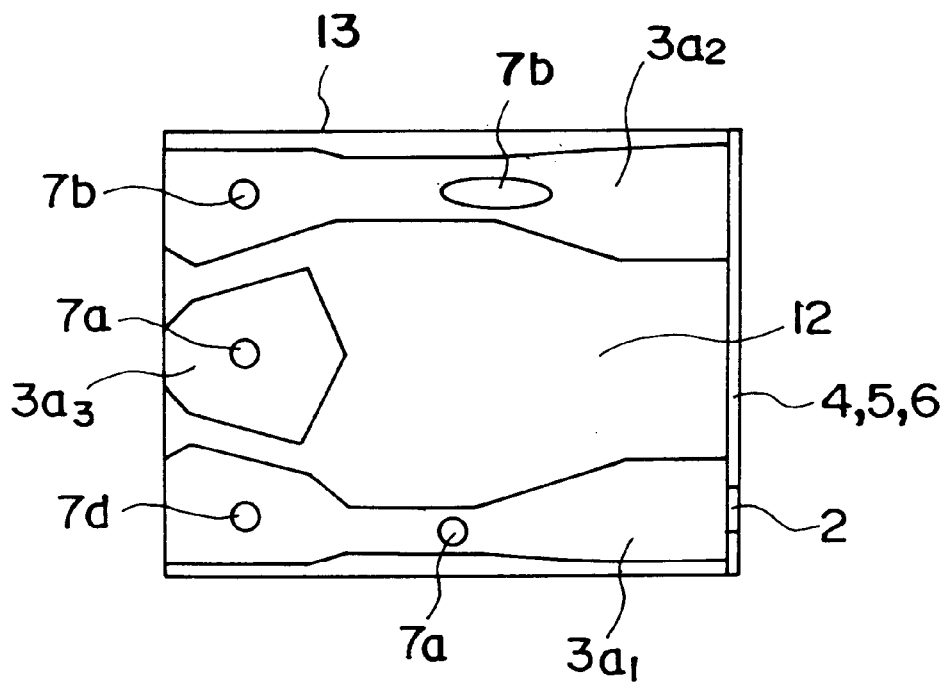
FIGS. 8A and 8B are plan views showing a slider having a magnetic head according to a second embodiment of the present invention.
Figure 8B:
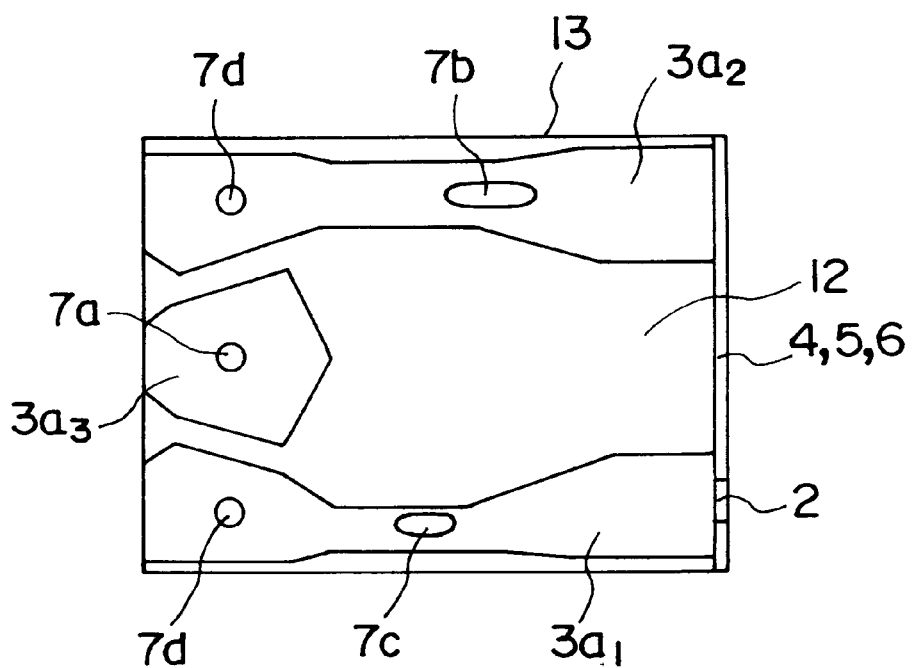

To widen the area of the pad 7a, as shown in FIGS. 8A and 8B, it is preferable that a pad 7b or 7c lengthened in a longitudinal direction of the first or second rail plane 3a1 or 3a2 be arranged on the first or second rail plane 3a1 or 3a2. In FIG. 8A, a widened pad 7b is arranged near a back end of the second rail plane 3a2 far from the electro-magnetic transducing device 2. In FIG. 8B, a pair of widened pads 7b and 7c are arranged near the back ends of the first and second rail planes 3a1 and 3a2. Also, one pad 7d is arranged near the front end of each of the first and second rail plane 3a1 and 3a2.

A distance from the back end of the slider 13 to the pad 7b or 7c differs from that in the first embodiment, and the detail of the distance is described according to a next embodiment.

Third Embodiment

Figures 2, 4B:
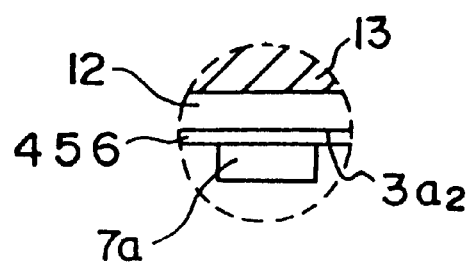
Figure 9A:
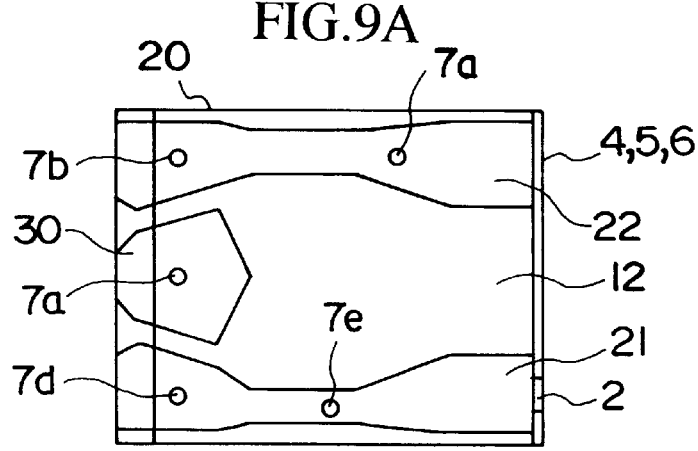
FIG. 9A is a plan view showing a slider having a magnetic head according to a third embodiment of the present invention.
Figure 9B:
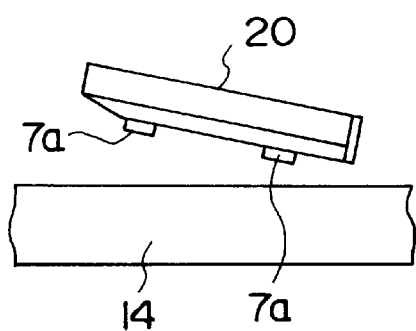
FIG. 9B is a side view showing a floating condition of the magnetic head slider shown in FIG. 9A.
Figure 9C:
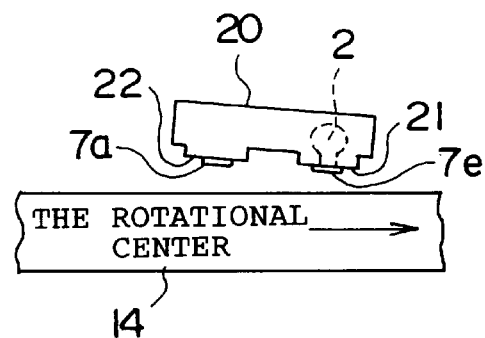
FIG. 9C is a front view showing a floating condition of the magnetic head slider shown in FIG. 9A.

To make the electro-magnetic transducing device 2 approach the magnetic disk 14 when the slider according to the first embodiment floats up into the air, a following structure of a slider is adopted. FIGS. 9A to 9C show a slider according to the third embodiment and a condition that the slider floats up into the air. Constructional parts shown in FIG. 9A which are identical with the parts shown in FIG. 4 are indicated by the same reference numerals as those shown in FIG. 4.

In cases where a slider 20 shown in FIG. 9A floats up into the air, as shown in FIG. 9B, a flying height of the slider 20 at its back end is lower than that at its front end. In this case, as shown in FIG. 9C, when the configuration of the slider 20 is set on condition that a flying height of a first rail plane 21 near to the electro-magnetic transducing device 2 is lower than that of a second rail plane 22 far from the electro-magnetic transducing device 2, a flying height of the slider 20 at the back end of the first rail plane 21 is lowest. Therefore, even though the electro-magnetic transducing device 2 attached to the back end of the first rail plane 21 closely approaches the magnetic disk 14, the contact of the rail plane 21 or 22 with the surface of the magnetic disk 14 can be prevented. Accordingly, the configuration of the slider 20 is appropriate to read and write information recorded at a high density.

To make a difference between a flying height of the slider 20 at the first rail plane 21 and a flying height of the slider 20 at the second rail plane 22, the configuration of the slider 20 is determined on condition that a width of a region ranging from the middle to the back end of the first rail plane 21 is narrower than that of the second rail plane 22. In this configuration, because the flying height of the second rail plane 22 is higher than that of the first rail plane 21, a probability that the pads 7a and 7b arranged on the second rail plane 22 contact with the magnetic disk 14 is lowered. However, because a particular region placed at the back end of the first rail plane 21 closely approaches the magnetic disk 14, it is required to prevent the contact of a pad 7e arranged in the neighborhood of the particular region with the surface of the magnetic disk 14.

To prevent the contact of the pad 7e with the surface of the magnetic disk 14, there is an idea that the height of the pad 7e is lowered. However, as is described in the first embodiment, it is not preferred that the height of the pad 7e is set to a value lower than 20 nm. Therefore, as shown in FIG. 9A, in cases where a distance from the pad 7e arranged on the first rail plane 21 to the back end of the first rail plane 21 is set to be longer than that from the pad 7a arranged on the second rail plane 22 to the back end of the second rail plane 22, even though the back end of the first rail plane 21 closely approaches the magnetic disk 14, the contact of the pad 7e arranged on the first rail plane 21 with the surface of the magnetic disk 14 can be prevented. In this case, the arrangement of the pads 7a, 7b, 7d and 7e is determined on condition that the slider 20 is stably put on the surface of the magnetic disk 14 when the magnetic disk 14 is not rotated. Therefore, any troublesomeness can be prevented even though the distance from the pad 7e to the back end of the first rail plane 21 is longer than that from the pad 7a to the back end of the second rail plane 22.

Accordingly, any contact of the slider 20 with the surface of the magnetic disk 14 can be prevented when the magnetic disk 14 is rotated.

Fourth Embodiment

The flying heights at both sides of the slider change with a distance from a position of the slider to a rotational center of the magnetic disk 14. The reason is that a circumferential speed of the magnetic disk 14 at a particular position is heightened as a distance from the rotational center of the magnetic disk 14 to the particular position is increased even though the magnetic disk is rotated at a constant speed.

Also, when the slider approaches an outer circumference of the magnetic disk, because the flying height of the slider at its front end (or the air inflow end) is moreover heightened, a probability that the back end (or the air outflow end) of the slider contacts with the magnetic disk is considerably decreased. Therefore, as shown in FIG. 10, the slider having a particular floating characteristic in which the flying height of the slider at the air outflow end of the first rail plane 21 is almost the same as that at the air outflow end of the second rail plane 22 can be used.

That is, as shown in FIGS. 9B and 9C, the configuration of the slider 20 is designed on condition that the flying height of the slider 20 at the back end of the first rail plane 21 near to the electro-magnetic transducing device 2 is lower than that at the back end of the second rail plane 22 far from the electro-magnetic transducing device 2 when the slider 20 approaches the rotational center of the magnetic disk 14. Also, the configuration of the slider 20 is designed on condition that the flying height of the slider 20 at the back end of the second rail plane 22 is lowered and approaches the flying height of the slider 20 at the back end of the first rail plane 21 as the slider 20 is far from the rotational center of the magnetic disk 14.

To satisfy the above conditions in the configuration of the slider 20, the first rail plane 21 is arranged on an outer side of the slider 20 with respect to the rotational center of the magnetic disk 14, the second rail plane 22 is arranged on an inner side of the slider 20 with respect to the rotational center of the magnetic disk 14, a first width of a portion of the first rail plane 21 is set to be narrower than a second width of the second rail plane 22, and a ratio of the first width to the second width is adjusted. Therefore, the configuration of the slider 20 satisfying the above conditions can be obtained. Specifically, a width of a portion of the first rail plane 21 spaced at a distance from the back end of the slider 20 is set to be narrower than a width of a portion of the second rail plane 22 spaced at the same distance.

Figure 10:
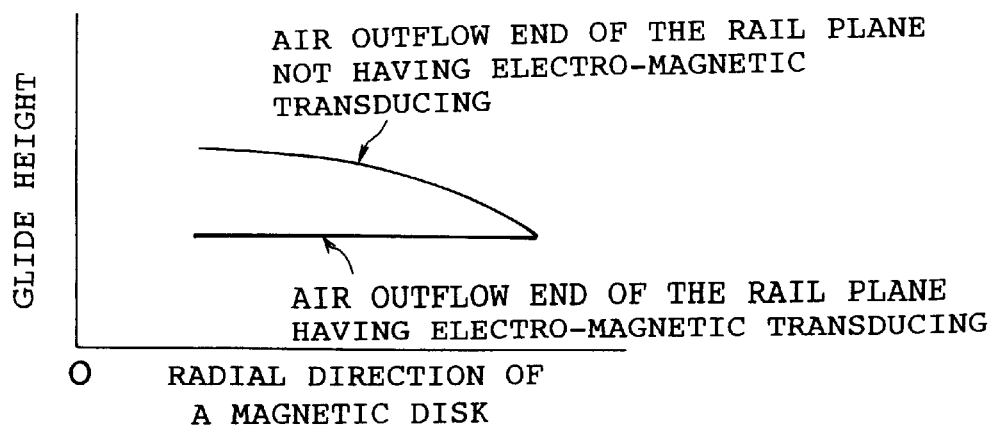
FIG. 10 shows a relationship between a flying height of the magnetic head slider according to a fourth embodiment of the present invention and a position of the slider in a radial direction of a magnetic disk.

In cases where the slider 20 is designed to satisfy the floating characteristic shown in FIG. 10, the rolling of the slider 20 can be prevented when the slider 20 floats up into the air, the slider 20 can stably float up into the air, the flying height of the electro-magnetic transducing device 2 can be maintained at a low value.

Fifth Embodiment

Figure 11:
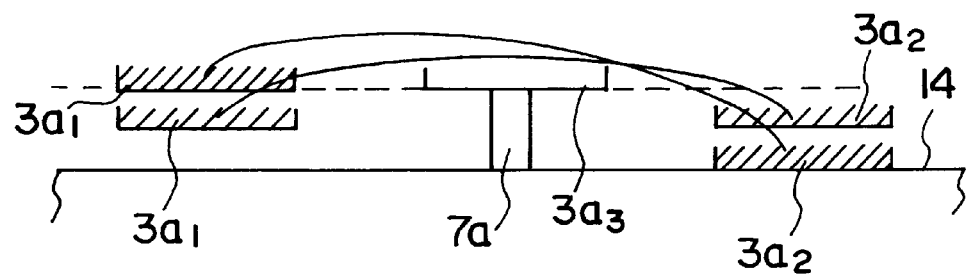
FIG. 11 shows a contacting condition of the magnetic head slider contacting with the magnetic disk in cases where the slider is curved or twisted.
Figure 12A:
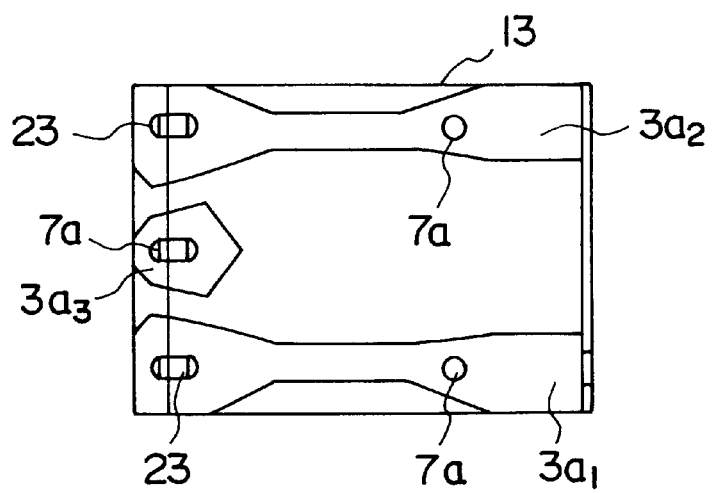
FIGS. 12A and 12B are plan views showing a slider having a magnetic head according to a fifth embodiment of the present invention.

When the magnetic head slider is downsized, a camber or twist occurring in the slider in a slider manufacturing process cannot be disregarded. For example, in cases where a camber degree of the slider 13 shown in FIG. 4 of 15 nm, a twist degree of the slider 13 is 15 nm and a height of the pad 7a is 30 nm, as shown in FIG. 11, the rail planes 3a1 and 3a2 except the rail plane 3a3 on which the pad 7a placed near the air inflow end of the slider 13 is arranged easily contact with the surface of the magnetic disk 14. Because the rail planes 3a1 and 3a2 contact with the surface of the magnetic disk 14 and the adhesion of the rail planes 3a1 and 3a2 to the magnetic disk 14 occurs and is increased, it is required to prevent the contact of the rail planes 3a1 and 3a2 with the surface To prevent the contact, as shown in FIG. 12A, not only the pad 7a placed near the air inflow end of the slider 13 is arranged on the third rail plane 3a3, but also a pair of pads 23 placed near the front end (or the air inflow end) of the slider 13 are arranged on the first and second rail planes 3a1 and 3a2. In cases where the pads 23 exist at the front side of the slider 13, because the slider 13 is supported by the four or more pads on the magnetic disk 14 when the magnetic disk 14 is not rotated, even though the camber or twist occurs in the slider 13, the contact of the rail planes 3a1 and 3a2 with the surface of the magnetic disk 14 can be prevented when the magnetic disk 14 is not rotated.

Also, in cases where the degree of the camber or twist occurring in the slider 13 in the slider manufacturing process is large, an area of each pad 23 is widened. In this case, the pads 23 can easily contact with the magnetic disk 14.

Futher, even though the camber or twist occurs in the slider 13, because a lot of pads, for example four or more pads 7a and 23 placed in the CSS region do not contact with the magnetic disk 14, there is a merit in view of the prevention of the adhesion of many pads to the magnetic disk 14.

However, the plurality of pads 7a and 23 arranged on the first and second rail planes 3a1 and 3a2 pass through the same route in the CSS region of the magnetic disk 14, there is a following drawback. That is, after the pad 23 placed near the front end of the slider 13 passes through a route while pushing aside a lubricant layer placed on the magnetic disk 14, the pad 7a placed near the back end (or the air outflow end) of the slider 13 passes through the same route in which the lubricant layer has been already pushed aside. Therefore, because a lubricant effect is not given to the pad 7a placed near the back end of the slider 13, the pad 7a is easily sworn by the magnetic disk 14.

Figure 12B:
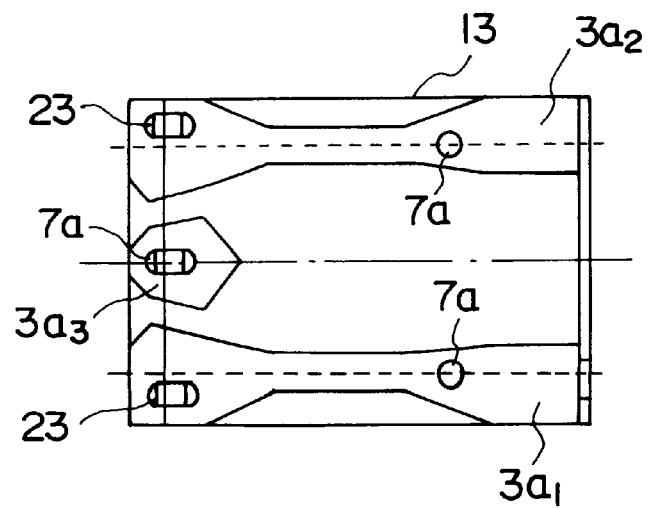

To prevent this drawback, as shown in FIG. 12B, the plurality of pads 7a and 23 are arranged on the first and second rail planes 3a1 and 3a2 on condition that the pads 7a and 23 pass through different routes in the CSS region of the magnetic disk 14 while considering a yaw angle of the slider 13.

Sixth Embodiment

In a magnetic disk apparatus having a floating type slider, the pads described above are arranged in the slider to prevent the adhesion of the slider to the surface of the magnetic disk 14. Also, in cases where the flying height of the slider is lowered, when a surface roughness of the magnetic disk 14 is reduced to prevent the contact of the slider with asperities of the magnetic disk surface, there is a drawback that the adhesion of the pads to the surface of the magnetic disk 14 easily occurs. Therefore, the configuration of the slider determined on condition that the contact of the electro-magnetic transducing device 2 with the surface of the magnetic disk 14 is prevented without reducing the surface roughness of the magnetic disk 14 is described.

Figure 13A:
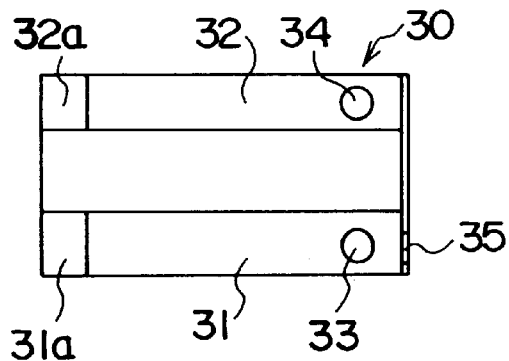
FIG. 13A is a plan view showing a slider having a magnetic head according to a sixth embodiment of the present invention.
Figure 13B:
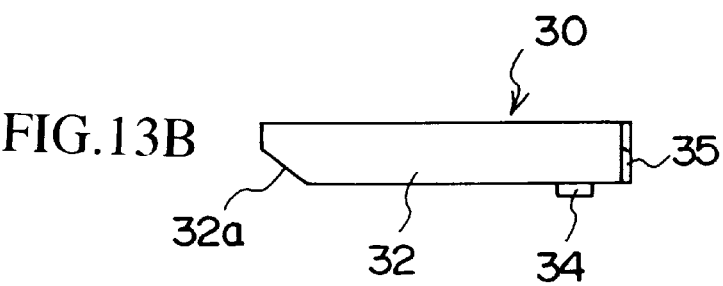
FIG. 13B is a side view showing the magnetic head slider according to the sixth embodiment of the present invention.
Figure 15A:
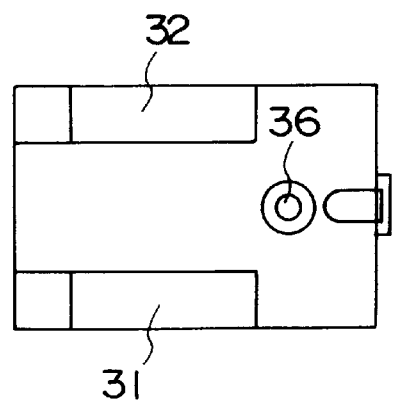
FIG. 15A is a plan view showing a slider having a magnetic head according to a modification of the sixth embodiment of the present invention.
Figure 15B:
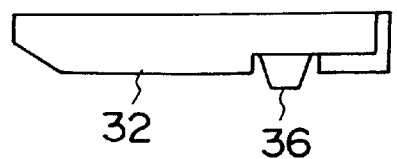
FIG. 15B is a side view showing the slider having the magnetic head according to the modification of the sixth embodiment.
Figure 14A:
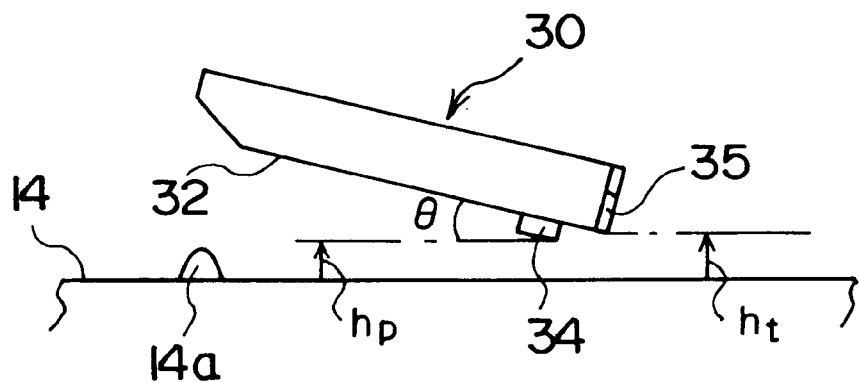
FIG. 14A is a side view showing a floating condition of the magnetic head slider according to the sixth embodiment of the present invention.
Figure 14B:
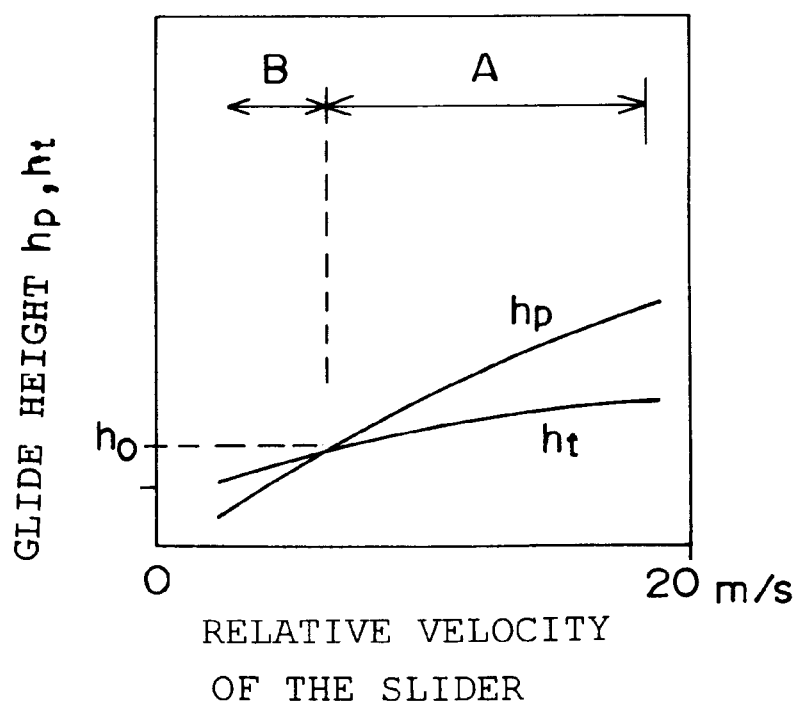
FIG. 14B shows a relationship between a relative speed of the magnetic head slider to the magnetic disk and a flying height of the magnetic head slider.

FIG. 13A is a plan view showing a slider having a magnetic head according to a sixth embodiment of the present invention, FIG. 13B is a side view showing the magnetic head slider according to the sixth embodiment of the present invention, FIG. 14A is a side view showing a floating condition of the magnetic head slider according to the sixth embodiment of the present invention, and FIG. 14B shows a relationship between a relative speed of the magnetic head slider to the magnetic disk and a flying height of the magnetic head slider.

A first rail plane 31 and a second rail plane 32 are arranged on both sides of a slider 30 to be opposite to the magnetic disk 14. A pair of taper planes 31a and 32a are arranged near the front end (or the air inflow end) of the first and second rail planes 31 and 32, and a pair of pads 33 and 34 are arranged near the back end (or the air outflow end) of the first and second rail planes 31 and 32. Also, an electro-magnetic transducing device 35 is arranged at the back end of the first rail plane 31. The slider 30 is attached at a top end of the suspension 16 in the magnetic disk apparatus shown in FIG. 7, and the slider 30 is risen up into the air by receiving an air flow occurring by the rotation of the magnetic disk 14.

Because the taper planes 31a and 32a are arranged at the front end of the first and second rail planes 31 and 32, as shown in FIG. 14A, as a relative speed V of the first and second rail planes 31 and 32 to the magnetic disk 14 is increased when the slider 30 is set in a floating condition, the flying height of the slider 30 at its front end becomes higher than the flying height of the slider 30 at its back end. That is, an inclination angle (or a pitch angle) θ of the first and second rail planes 31 and 32 is increased as the relative speed V is increased.

Also, the circumferential speed at a particular position of the magnetic disk 14 rotated at a constant speed is heightened as a distance from the rotational center of the magnetic disk 14 to the particular position is increased. Therefore, the pitch angle θ of the first and second rail planes 31 and 32 of the slider 30 floating up over the magnetic disk 14 is increased as the slider 30 is moved toward the outer side of the magnetic disk 14. Also, as the pitch angle e is increased, a flying height Ht of the electro-magnetic transducing device 35 from the magnetic disk 14 is increased and flying height Hp of the pads 33 and 34 arranged near the back end of the first and second rail planes 31 and 32 is increased.

In this case, the flying height Ht of the electro-magnetic transducing device 35 is gradually increased as compared with the increase of the flying height Hp as the relative speed V is increased. Here, though the slider 30 is generally designed on condition that the flying height Ht of the electro-magnetic transducing device 35 is maintained at a constant value even though the relative speed V changes, as shown in FIG. 14B, the flying height Ht of the electro-magnetic transducing device 35 is slightly increased in practice with the increase of the relative speed V. Also, because positions of the pads 33 and 34 are nearer to the front end of the slider 30 than that of the electro-magnetic transducing device 35, the flying height Hp of the pads 33 and 34 is rapidly increased as compared with the increase of the flying height Ht.

As is described above, in cases where the slider 30 is designed to record information in the magnetic disk 14 at a high density, it is required that the flying height Ht of the electro-magnetic transducing device 35 is maintained at a low value, so that it is required that the contact of the electro-magnetic transducing device 35 with the surface of the magnetic disk 14 is reliably prevented.

Therefore, as shown in FIG. 14B, the slider 30 is designed to set the flying height Hp of the pads 33 and 34 to a value equal to or lower than the flying height Ht of the electro-magnetic transducing device 35 when the slider 30 floats up over a region B of the magnetic disk 14 in which the flying height Ht of the electro-magnetic transducing device 35 is equal to or lower than a reference value h0 of about 30 nm. In this case, when asperities 14a generated by the surface roughness of the magnetic disk 14 exists in the region B of the magnetic disk 14, the pads 33 and 34 placed slightly in front of the electro-magnetic transducing device 35 preferentially contact with the asperities 14a, so that the contact of the electro-magnetic transducing device 35 with the asperities 14a can be prevented, and the damage of the electro-magnetic transducing device 35 can be prevented.

In contrast, when the slider 30 floats up over a region A of the magnetic disk 14 in which the flying height Ht of the electro-magnetic transducing device 35 is higher than the reference value h0, because a probability that the electro-magnetic transducing device 35 contacts with a asperities 14a placed in the region A of the magnetic disk 14 is very low, it is allowed that the flying height Hp of the pads 33 and 34 is higher than the flying height Ht of the electro-magnetic transducing device 35. Also, because the front side of the slider 30 is heightened as the slider 30 approaches the outer circumference of the magnetic disk 14 while increasing the relative speed V, the slider 30 can be easily designed to set the flying height Hp of the pads 33 and 34 to a value higher than the flying height Ht of the electro-magnetic transducing device 35 when the slider 30 floats up over the region A of the magnetic disk 14.

In summary, the slider 30 is moved from the inner circumference to the outer circumference of the magnetic disk 14 according to a seeking operation when the magnetic disk 14 is rotated at a practical rotation speed in a normal operation time of the magnetic disk apparatus, and the flying heights Hp and Ht satisfy the relationship Hp≦Ht in cases where the slider 30 is placed in the region B of the magnetic disk 14. In this case, when a difference Ht–Hp of the flying heights Hp and Ht becomes too large, because the flying height Ht is increased, information cannot be recorded in the magnetic disk 14 at a high density, and the pads 33 and 34 easily contact with projections (or asperities) of the magnetic disk 14. Therefore, it is not preferable that the difference Ht–Hp become too large, and it is preferred that the difference Ht–Hp be equal to or lower than 30 nm. A maximum value of the difference Ht–Hp is equal to a distance between the electro-magnetic transducing device 35 and a bottom portion of each of the pads 33 and 34.

Also, though the relationship of the flying heights Hp and Ht is not limited in case of the region A of the magnetic disk 14, a relationship Hp>Ht is preferred to float the electro-magnetic transducing device 35 at a low height.

The change of the flying height can be obtained by adjusting a thickness of each of the pads 33 and 34, a rotational speed of the magnetic disk 14, a size of the negative region of the slider 30, areas of the rail planes 31 and 32, and areas of the taper planes 31a and 32a.

The pads 33 and 34 are arranged in the slider 30 on the assumption that the pads 33 and 34 contact with the asperities 14a of the magnetic disk 14. Therefore, it is preferred that the pads 33 and 34 be made of a ceramic type material having a comparatively high hardness to prevent the pads 33 and 34 be worn out. For example, a carbon type material such as diamond carbon or amorphous carbon is arranged on surfaces of the pads 33 and 34, the pads 33 and 34 having a hardness of about 2500 can be obtained. Also, it is applicable that boride, carbide or nitride be arranged on surfaces of the pads 33 and 34.

Also, a lubricating film is often coated on the surface of the magnetic disk 14 in the magnetic disk apparatus. In cases where a lubricant made of a carbon-fluoride type having a benzene ring is used to form the lubricating film, surfaces of the pads 33 and 34 are covered with carbon type films or the pads 33 and 34 are made of carbon type material, so that the lubricant can be easily attached to the surfaces of the pads 33 and 34. Also, in cases where a liquid lubricant made of a carbon-fluoride type having a hydrogen group is used to form the lubricating film, the surfaces of the pads 33 and 34 are covered with an oxide type material (for example, $Al_2O_3$ or $SiO_2$) or the pads 33 and 34 are made of the oxide type material, so that the lubricant can be easily attached to the surfaces of the pads 33 and 34.

When the lubricant is attached to the surfaces of the pads 33 and 34, a lubricative condition of the pads 33 and 34 becomes preferable, a degree of the friction between the magnetic disk 14 and a group of the pads 33 and 34 is lowered. Therefore, even though the pad 33 or 34 contacts with the surface of the magnetic disk 14 (or a magnetic recording medium) and the pad 33 or 34 is sworn by the magnetic disk 14, the damage of the pad 33 or 34 can be reduced.

Because a hardness of a magnetic material used for the electro-magnetic transducing device 35 ranges from 100 to 800, the electro-magnetic transducing device 35 is often covered with aluminum oxide having a hardness of about 2000 to protect the electro-magnetic transducing device 35. However, a surface of the electro-magnetic transducing device 35 facing the magnetic disk 14 is not generally covered with the aluminum oxide.

In the above description, in cases where the pads 33 and 34 are arranged on the first and second rail planes 31 and 32 of the slider 30, the flying height Hp of the pads 33 and 34 is deeply considered. However, it is not limited to the arrangement of the pads 33 and 34 on the first and second rail planes 31 and 32. That is, it is applicable that the pads 33 and 34 be arranged on a particular surface facing the magnetic disk 14 and the particular surface is not placed on each of the rail planes 31 and 32. In this case, when the relationship of the flying heights Hp and Ht shown in FIG. 14B is satisfied, the electro-magnetic transducing device 35 can be protected.

In the above embodiments, one or more pads are used to prevent the contact of the electro-magnetic transducing device 2 or 35 with the magnetic disk 14. However, the present invention is not limited to the pads. That is, it is applicable that one or more projections functioning to prevent the electro-magnetic transducing device 2 or 35 closely approach the magnetic disk 14 be used in place of the pads.

What is claimed is:

1. A magnetic head slider, comprising:
    a body;
    a first rail plane arranged on one side of the body for generating a first floating force;
    at least one first pad arranged near an air outflow end of the first rail plane;
    a second rail plane arranged on the other side of the body for generating a second floating force;
    at least one second pad arranged near an air outflow end of the second rail plane on condition that a distance from the rearmost second pad closest to the air outflow end of the second rail plane is greater than a distance from the rearmost first pad to the air outflow end of the first rail plane; and
    an electro-magnetic transducing device arranged on an air outflow end of the second rail plane;
    wherein the magnetic head slider is inclined in a floating state in which the magnetic head slider floats over a surface of a disk medium such that said air outflow end of said first and second rail planes is lower than a corresponding air inflow end of said first and second rail planes and said air outflow end of said second rail plane is generally lower than said air outflow end of said first rail plane.

2. A magnetic head slider according to claim 1 in which a width of the first rail plane at a first position of the first rail plane is narrower than a width of the second rail plane at a second position of the second rail plane on condition that a distant from the first position to the air outflow end of the first rail plane is the same as that from the second position to the air outflow end of the second rail plane.

3. A magnetic head slider according to claim 1 in which a shape of the first rail plane and a shape of the second rail plane are determined on condition that a flying height of the slider at the air inflow end of the first rail plane and another flying height of the slider at the air inflow end of the second rail plane are respectively heightened as an air inflow speed is increased and a difference between a flying height of the slider at the air outflow end of the first rail plane and another flying height of the slider at the air outflow end of the second rail plane is lowered as the air inflow speed is increased.

4. A magnetic head slider according to claim 1 in which the first pad or the second pad has a plane shape lengthened in a direction of an air flow.

5. A magnetic head slider according to claim 1 in which a plane shape of the first pad arranged on the first rail plane has a circular plane shape, and the second pad arranged on the second rail plane has a plane shape lengthened in a longitudinal direction of the second rail plane.

6. A magnetic head slider according to claim 1 in which the height of the first and second pads ranges from 20 to 50 nm.

7. A magnetic disk apparatus, comprising:
    a magnetic slider having a rail plane used for the generation of a floating force;
    a first pad placed near an air inflow end of the rail plane and a second pad placed near an air outflow end of the rail plane on condition that a height of the first pad and a height of the second pad respectively range from 25 to 40 nm;
    an electro-magnetic transducing device attached to the air outflow end of the rail plane of the magnetic head slider;
    a spring arm for supporting the magnetic head slider; and
    a magnetic disk facing the rail plane of the magnetic head slider;
    wherein the magnetic head slider is inclined in a floating state in which the magnetic head slider floats over a surface of a disk medium such that said air outflow end is lower than said air inflow end.

8. A magnetic disk apparatus comprising:
    (a) a magnetic slider having
        (1) a body,
        (2) a first rail plane arranged on one side of the body,
        (3) a first pad arranged near an air outflow end of the first rail plane;
        (4) a second rail plane arranged on the other side of the body and generating a second floating force,
        (5) a second pad arranged near an air outflow end of the second rail plane on condition that a distance from the rearmost second pad closest to the air outflow end of the second rail plane is greater than a distance from the rearmost first pad to the air outflow end of the first rail plane; and
    (b) an electro-magnetic transducing device attached to the air outflow end of the second rail plane of the magnetic head slider;
    (c) a spring arm for supporting the magnetic head slider; and
    (d) a magnetic disk facing the first and second rail planes of the magnetic head slider;
    (e) wherein the magnetic head slider is inclined in a floating state in which the magnetic head slider floats over a surface of a disk medium such that said air outflow end of said first and second rail planes is lower than a corresponding air inflow end of said first and second rail planes and said air outflow end of said second rail plane is generally lower than said air outflow end of said first rail plane.

9. A head slider for flying over a recording medium, comprising:
    a body;
    a first rail arranged on said body for generating a first flying force;
    a second rail arranged on said body for generating a second flying force;
    a head element arranged at an air outflow end of said first rail;
    a first front pad arranged near an air inflow end of said first rail;

a second font pad arranged near an air inflow end of said second rail;

a first rear pad arranged near the air outflow end of said first rail and having a first distance to the air outflow end of said first rail; and a second rear pad arranged near an air outflow end of said second rail and having a second distance to the outflow end of second rail, the second distance being shorter than the first distance;

wherein the head slider is inclined in a floating state in which the head slider floats over a surface of a disk medium such that said air outflow end of said first and second rails is lower than a corresponding air inflow end of said first and second rails and said air outflow end of said second rail is generally lower than said air outflow end of said first rail.

10. A head slider according to claim 9, wherein said first rail has a first average width and said second rail has a second average width wider than the first average width.

11. A head slider according to claim 9, further comprising;

a center rail arranged between said first and second rails and near an air inflow end of said head slider.

* * * * *